United States Patent
Kwok

(10) Patent No.: US 9,697,140 B2
(45) Date of Patent: Jul. 4, 2017

(54) ENCRYPTION INTEGRITY CHECK WITH CRC ENCRYPTION IN MEMORY USING A WORD COUNT- AND ADDRESS-DERIVED NONCE

(71) Applicant: Intel Corporation, Santa Clara, CA (US)

(72) Inventor: Zion S. Kwok, Burnaby (CA)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 14/493,924

(22) Filed: Sep. 23, 2014

(65) Prior Publication Data

US 2016/0085692 A1 Mar. 24, 2016

(51) Int. Cl.
G06F 12/14 (2006.01)
G06F 21/80 (2013.01)
G06F 21/79 (2013.01)

(52) U.S. Cl.
CPC .......... *G06F 12/1408* (2013.01); *G06F 21/79* (2013.01); *G06F 2212/402* (2013.01); *G06F 2212/403* (2013.01)

(58) Field of Classification Search
CPC ................. G06F 12/1408; G06F 21/79; G06F 2212/408; G06F 2212/409
USPC ........................................ 713/193, 150, 190
See application file for complete search history.

(56) References Cited

U.S. PATENT DOCUMENTS

2007/0094309 A1 4/2007 Buckingham et al.
2007/0288809 A1* 12/2007 Baba ................... G06F 11/1004
714/718
2008/0155273 A1 6/2008 Conti
2009/0041234 A1 2/2009 Gruba et al.
2009/0208018 A1* 8/2009 Buckingham ......... G06F 21/606
380/277
2009/0252323 A1* 10/2009 Cooper ............... G06F 21/6218
380/54
2010/0211834 A1* 8/2010 Asnaashari ............. G06F 11/10
714/718
2011/0041039 A1 2/2011 Harari et al.
2012/0166715 A1* 6/2012 Frost ................... G06F 11/1068
711/103
2012/0284587 A1* 11/2012 Yu ......................... G06F 3/0608
714/773

(Continued)

FOREIGN PATENT DOCUMENTS

EP 1050821 A2 11/2000

OTHER PUBLICATIONS

International Search Report and Written Opinion received for PCT Application No. PCT/US2015/046025, mailed on Nov. 30, 2015, 13 pages.

*Primary Examiner* — Haresh N Patel
(74) *Attorney, Agent, or Firm* — Thorpe North & Western, LLP; Todd B. Alder

(57) ABSTRACT

Apparatus, systems, and methods for AES integrity check in memory are described. In one embodiment, a controller comprises logic to receive a write request from a host device to write a line of data to the memory device, determine a first plaintext cyclic redundancy check from the line of data, encrypt the line of data, encrypt the first plaintext CRC with a unique value to generate a first encrypted CRC, and store the encrypted line of data and the first encrypted CRC in memory. Other embodiments are also disclosed and claimed.

24 Claims, 9 Drawing Sheets

(56) References Cited

U.S. PATENT DOCUMENTS

| | | | |
|---|---|---|---|
| 2013/0194696 A1* | 8/2013 | Kitahara | G11B 5/012 360/75 |
| 2014/0115232 A1* | 4/2014 | Goss | G06F 11/1012 711/103 |
| 2014/0181532 A1* | 6/2014 | Camp | G06F 11/1068 713/190 |
| 2015/0019932 A1* | 1/2015 | Kondo | G06F 11/1004 714/758 |
| 2015/0026509 A1* | 1/2015 | Zhang | G06F 13/4059 714/6.11 |

* cited by examiner

ENCRYPTION INTEGRITY CHECK WITH CRC ENCRYPTION IN MEMORY USING A WORD COUNT- AND ADDRESS-DERIVED NONCE

TECHNICAL FIELD

The present disclosure generally relates to the field of electronics. More particularly, some embodiments of the invention generally relate to encryption integrity check in memory for electronic devices.

BACKGROUND

Many electronic devices include memory systems that may be implemented using local, fast-access memory which is frequently embodied as a nonvolatile memory, e.g., flash memory or the like. In some examples it may be useful to provide an encrypted data path from the host interface to the memory, e.g., by placing an encryption engine in the data path. One example of encryption is the Advanced Encryption Standard (AES)), published by the National Institute of Standards and Technology (NIST) as Federal Information Processing Standard (FIPS) 197.

A memory controller may need to implement an integrity check to ensure that the encryption engine is operating properly. Accordingly, techniques to manage integrity check processes in encrypted memory may find utility, e.g., in memory systems for electronic devices.

BRIEF DESCRIPTION OF THE DRAWINGS

The detailed description is provided with reference to the accompanying figures. The use of the same reference numbers in different figures indicates similar or identical items.

FIG. 5 is a flowchart illustrating operations in a method to implement encryption integrity check in read operations memory accordance with various embodiments discussed herein.

DESCRIPTION OF EMBODIMENTS

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Figure 1:
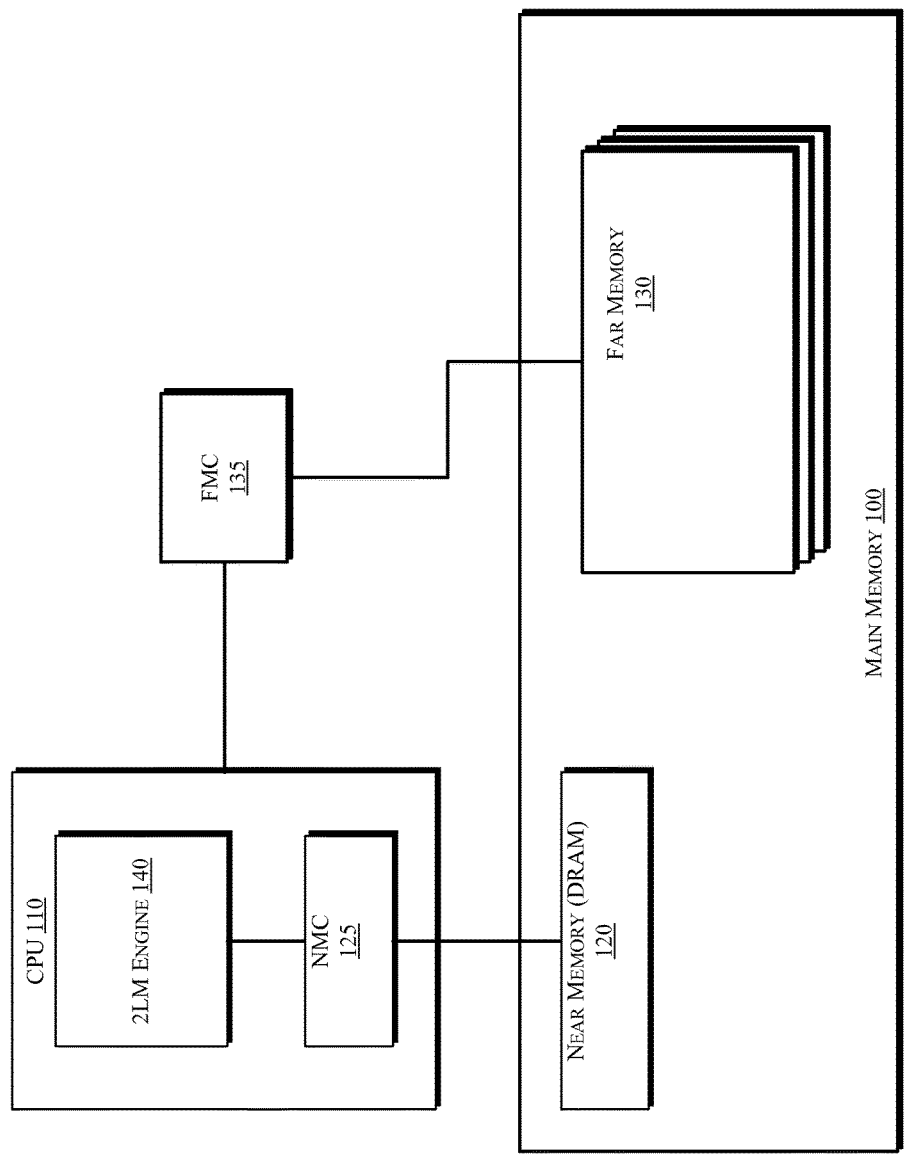
FIG. 1 is a schematic, block diagram illustration of components of apparatus to implement encryption integrity check in memory in accordance with various examples discussed herein.

FIG. 1 is a schematic, block diagram illustration of components of apparatus to implement encryption integrity check in memory in accordance with various examples discussed herein. System main memory 100 provides runtime data storage and access to the contents of system disk storage memory (not shown) to CPU 110. Said CPU may include cache memory, which would store a subset of the contents of main memory 100.

In this embodiment there are two levels of memory. Main memory 100 includes a level of volatile memory shown as near memory (DRAM) 120, and a level of memory, shown as far memory 130. Far memory may comprise either volatile memory, e.g., static random access memory (SRAM), a dynamic random access memory (DRAM), nonvolatile memory, or may include nonvolatile memory e.g., phase change memory, NAND (flash) memory, ferroelectric random-access memory (FeRAM), nanowire-based non-volatile memory, memory that incorporates memristor technology, three dimensional (3D) cross point memory such as phase change memory (PCM), magnetoresistive random access memory (MRAM), spin-transfer torque memory (STT-RAM) or NAND flash memory. In this embodiment, near memory 120 serves a low-latency and high-bandwidth (i.e., for CPU 110 access) cache of far memory 130, which may have considerably lower bandwidth and higher latency (i.e., for CPU 110 access).

In this embodiment, near memory 120 is managed by near memory controller (NMC) 125, while far memory 130 is managed by far memory controller (FMC) 135. FMC 135 reports far memory 130 to the system operating system (OS) as main memory—i.e., the system OS recognizes the size of far memory 130 as the size of system main memory 100. The system OS and system applications are "unaware" of the existence of near memory 120 as it is a "transparent" cache of far memory 130.

CPU 110 further comprises a two-level memory (2LM) engine module/logic 140. The "2LM engine" is a logical construct that may comprise hardware and/or micro-code extensions to support two-level main memory 100. For example, 2LM engine 140 may maintain a full tag table that tracks the status of all architecturally visible elements of far memory 130. For example, when CPU 110 attempts to access a specific data segment in main memory 100, 2LM engine 140 determines whether said data segment is included in near memory 120; if it is not, 2LM engine 140 fetches the data segment in far memory 130 and subsequently writes the data segment to near memory 120 (similar to a cache miss). It is to be understood that, because near memory 120 acts as a "cache" of far memory 130, 2LM engine 140 may further execute data prefetching or similar cache efficiency processes known in the art.

The 2LM engine 140 may manage other aspects of far memory 130. For example, in embodiments where far memory 130 comprises nonvolatile memory, it is understood that nonvolatile memory such as flash is subject to degradation of memory segments due to significant reads/writes. Thus, 2LM engine 140 may execute functions including wear-leveling, bad-block avoidance, and the like in a manner transparent to system software. For example, executing wear-leveling logic may include selecting segments from a free pool of clean unmapped segments in far memory 130 that have a relatively low erase cycle count.

It is to be understood that near memory 120 is smaller in size than far memory 130, although the exact ratio may vary based on, for example, intended system use. In this embodiment, it is to be understood that because far memory 130 comprises denser, cheaper nonvolatile memory, main memory 100 may be increased cheaply and efficiently and independent of the amount of DRAM (i.e., near memory 120) in the system.

Figure 2:
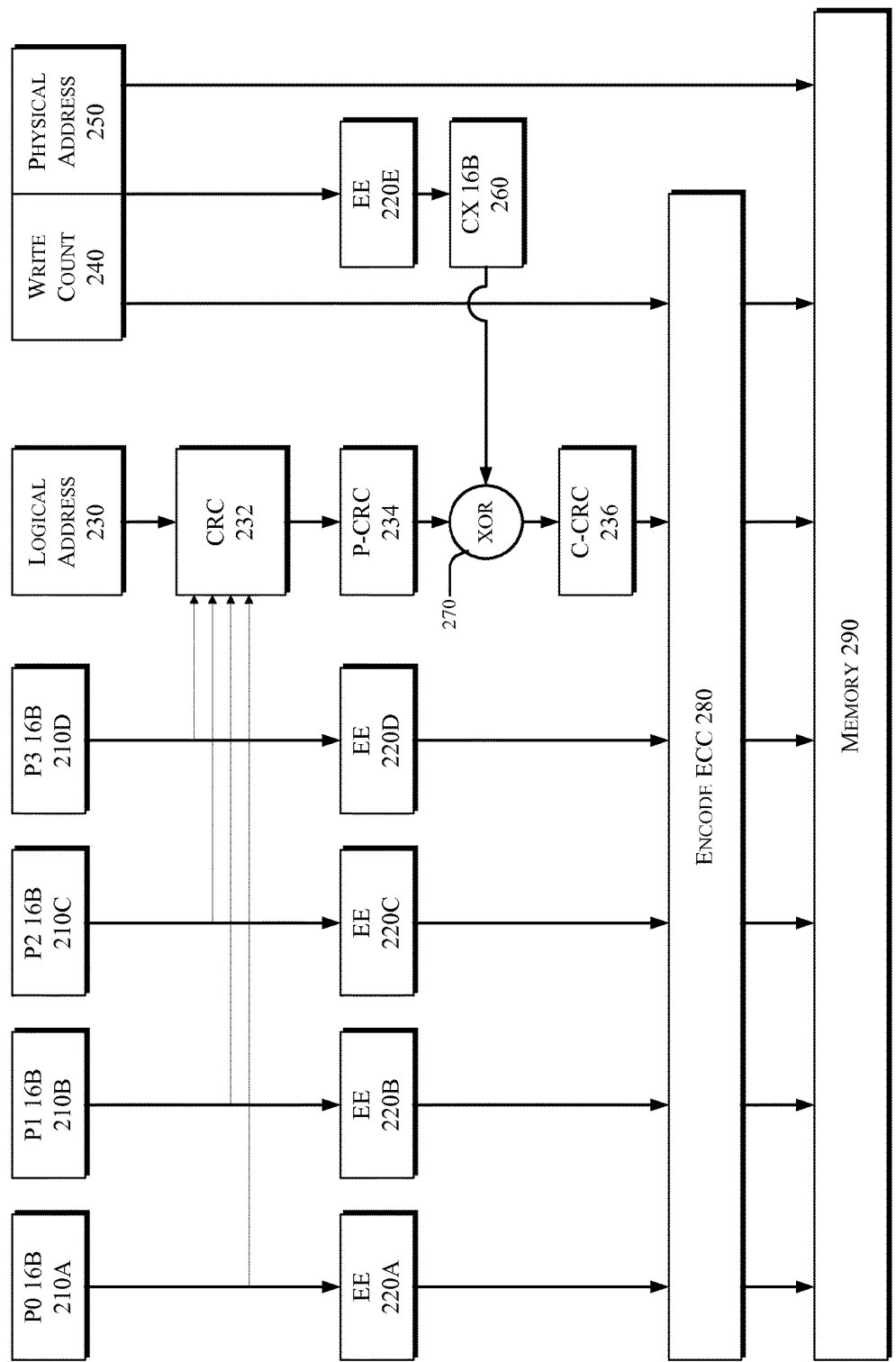
FIG. 2 is a schematic, block diagram illustration of an architecture to implement encryption integrity check in write operations memory in accordance with various examples discussed herein.
Figure 3:
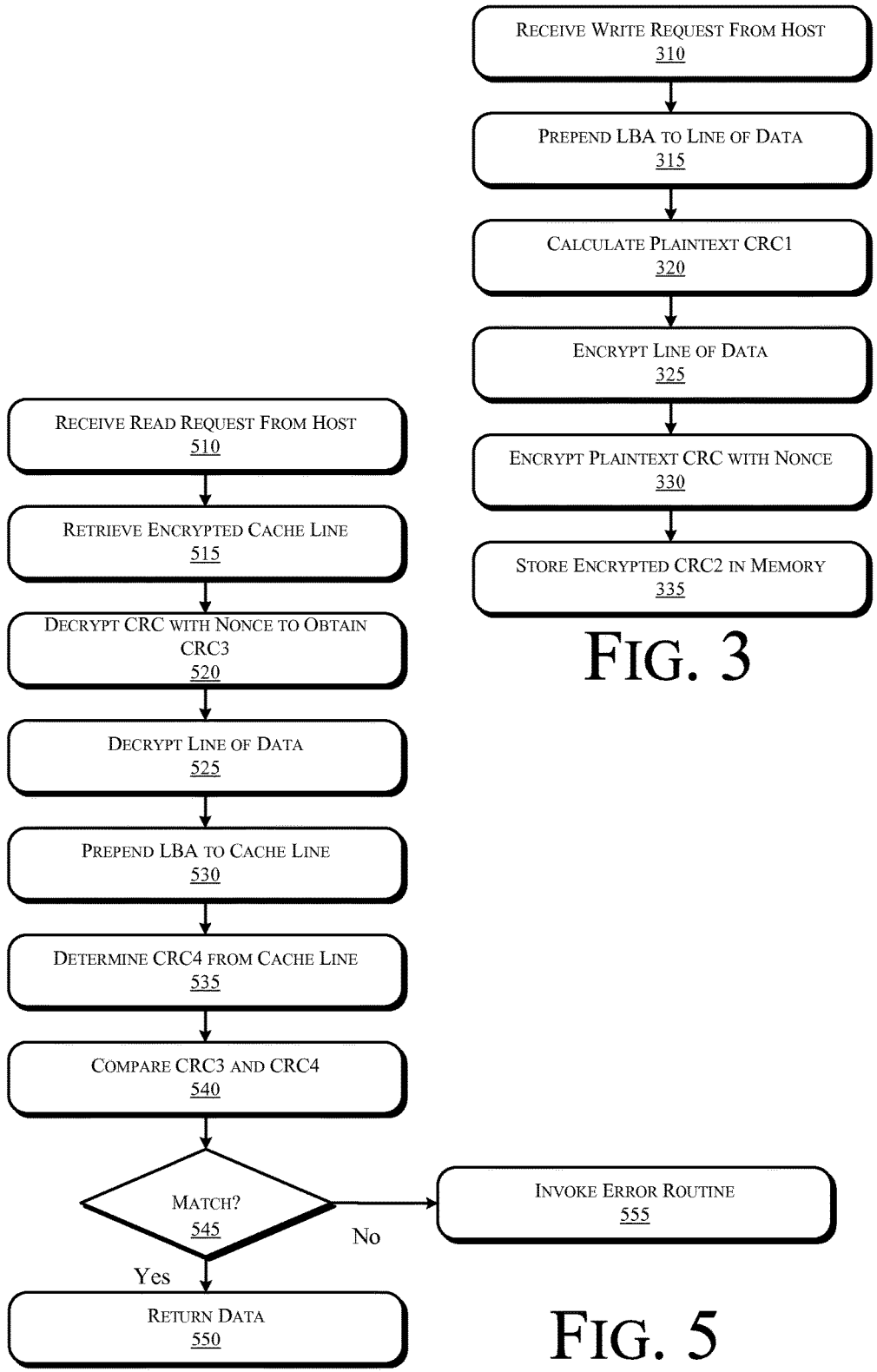
FIG. 3 is a flowchart illustrating operations in a method to implement encryption integrity check in write operations memory accordance with various embodiments discussed herein.

As described above, in some embodiments logic, e.g., in the far memory controller 135 implement AES integrity check in memory 100. A technique to implement AES integrity check in write operations in memory 100 will be explained with reference to FIGS. 2-3. Referring to FIGS. 2 and 3, at operation 310 the far memory controller 135 receives a write request from a host device. In some examples the write request may comprise 64 bytes of data broken into four 16 byte blocks indicated by reference numerals 210A, 210B, 210C, 210D in FIG. 2. However, it will be recognized that the amount of data in the write operation is not critical. Further, the write operation may comprise a logical address indicated by reference numeral 230 in FIG. 2.

At operation 315 the logical block address 230 is prepended to the line of data received in operation 310, e.g., to the 64 byte cache line, and at operation 320 a first plaintext cyclical redundancy check (CRC) is determined. In FIG. 2 the plaintext memory blocks 210A, 210B, 201C and 210D are input into CRC calculation module 232, which outputs a plaintext CRC 234.

At operation 325 the line of data received in operation 310 is encrypted. In FIG. 2 the 16 byte blocks of data 210A, 210B, 210C, 210D are input into respective encryption engines 220A, 220B, 220C, 220D. In alternate examples the 16 byte blocks of data 210A, 210B, 210C, 210D may be processed contemporaneously using a shared, pipelined encryption engine.

At operation 330 the plaintext CRC 234 is encrypted with a nonce formed from a concatenation of the write count 240 and the physical address 250 of memory in which the line of data is stored in memory. Referring to FIG. 2, the write count 240 and the physical address 250 are input to an encryption engine 220E, which outputs an encrypted 16 byte value 260. This 16 byte value 260 is XORed with the plaintext CRC 234 to generate an encrypted CRC.

The encrypted data, the encrypted CRC, and the write count are encoded in encoder 280 and stored (operation 335) in memory 290 to complete the write operation.

Figure 4:
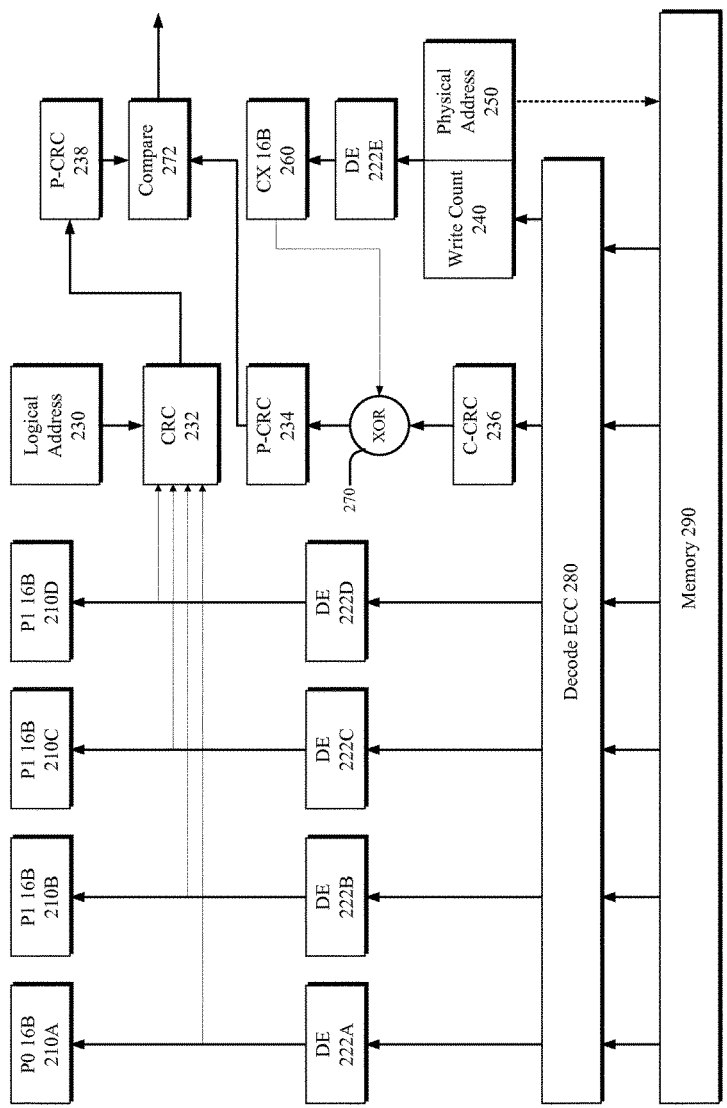
FIG. 4 is a schematic, block diagram illustration of an architecture to implement encryption integrity check in read operations memory in accordance with various examples discussed herein.

A technique to implement AES integrity check in read operations in memory will be explained with reference to FIGS. 4-5. Referring to FIGS. 4 and 5, at operation 510 the far memory controller 135 receives a read request from a host device. In some examples the read request may comprise a logical address indicated by reference numeral 230 in FIG. 4.

At operation 515 the encrypted cache line is retrieved from memory 290 and decoded in decoder 280. At operation 520 the encrypted CRC 236 is decrypted with a nonce formed from a concatenation of the write count 240 and the physical address 250 of memory in which the line of data is stored in memory. Referring to FIG. 4, the write count 240 and the physical address 250 are input to a decryption engine 222E, which outputs an decrypted 16 byte value 260. This 16 byte value 260 is XORed with the encrypted CRC 236 to generate an decrypted CRC 234.

At operation 525 the line of data retrieved from memory 290 is decrypted. In FIG. 4 the encrypted data is input into respective decryption engines 222A, 222B, 222C, 22D, which output an decrypted 16 byte blocks of decrypted data 210A, 210B, 210C, 210D. In alternate examples the encrypted data may be processed contemporaneously using a shared, pipelined decryption engine.

At operation 530 the logical block address 230 is prepended to the the plaintext memory blocks 210A, 210B, 201C and 210D output from encryption engines 220A, 220B, 220C, 220D, and at operation 535 a plaintext cyclical redundancy check (CRC) is determined. In FIG. 4 the plaintext memory blocks 210A, 210B, 201C and 210D output from encryption engines 220A, 220B, 220C, 220D and the LBA are input into CRC calculation module 232, which outputs a plaintext CRC 238.

At operation 540 the encrypted data, the plaintext CRC 234 and the plaintext CRC 238 are compared. Referring to FIG. 4, in some examples the plaintext CRC 234 and the plaintext CRC 238 are input to a comparator 272, which may comprise an XOR gate followed by a NAND gate. If, at operation 545 the CRC 234 and the CRC 238 match then data retrieved from memory 290 is returned. By contrast, if at operation 545 the CRC 234 and the CRC 238 do not match then an error routine is invoked.

Thus, the operations of FIGS. 3 and 5 enable a memory to implement an encryption integrity check in a memory device. More particularly, the operations depicted in FIGS. 3 and 5 allow for an integrity check of encrypted data without exposing the plaintext data or plaintext CRC information.

The 64B cache line cyphertext can be refreshed and the write count updated without needing to decrypt and re-encrypt the 64B cache line. Rather, only the CRC2 needs to be decrypted and re-encrypted with a new nonce formed from a concatenation of the write count associated with the refresh operation. Similarly, the 64B cache line cyphertext can be relocated to a different physical memory address and only the cyphertext CRC (C-CRC 236) needs to be updated with the new write count and new physical address. This reduces the amount of traffic flowing through the encryption engines and results in lower gate count and power consumption. Also, the memory refreshes and address indirection can be performed without knowledge of the logical block address, while the cyphertext CRC (C-CRC 236) still protects the logical block address.

It will be noted that calculating the cypher text CRC (C-CRC 236) does not incur an additional latency on encrypting the 64B data line. Similarly, calculating the fourth CRC (plaintext CRC 238) does not incur an additional encryption latency while decrypting the 64B cache line. Rather, encryption for the 64B cache line and the encryption for cypher text CRC (C-CRC 236) and plaintext CRC 238 can execute in parallel.

The write count is suitable as a nonce because it increments and is also needed for other purposes (wear leveling) and does not add to the number of overhead bits that need to be stored in memory. Note that the write count may be stored together with the data as meta data or in a separate address indirection table.

The logical address does not need an additional mechanism to check its validity. This means meta data bits originally used to store a hash of the logical address can be removed.

It will be recognized that the algorithm described herein can apply to encryption schemes other than AES, can have data sizes other than 64 bytes, can have a hash other than a CRC, and can have a CRC length of greater or less than 4 bits. Further, the write count can have any number of bits, as long as it is incremented for every write and is non-repeating for each physical address. The logical and physical addresses can be the same. The ECC can be BCH, Reed-Solomon, LDPC, Convolutional Codes, Hamming Codes, etc.

Figure 6:
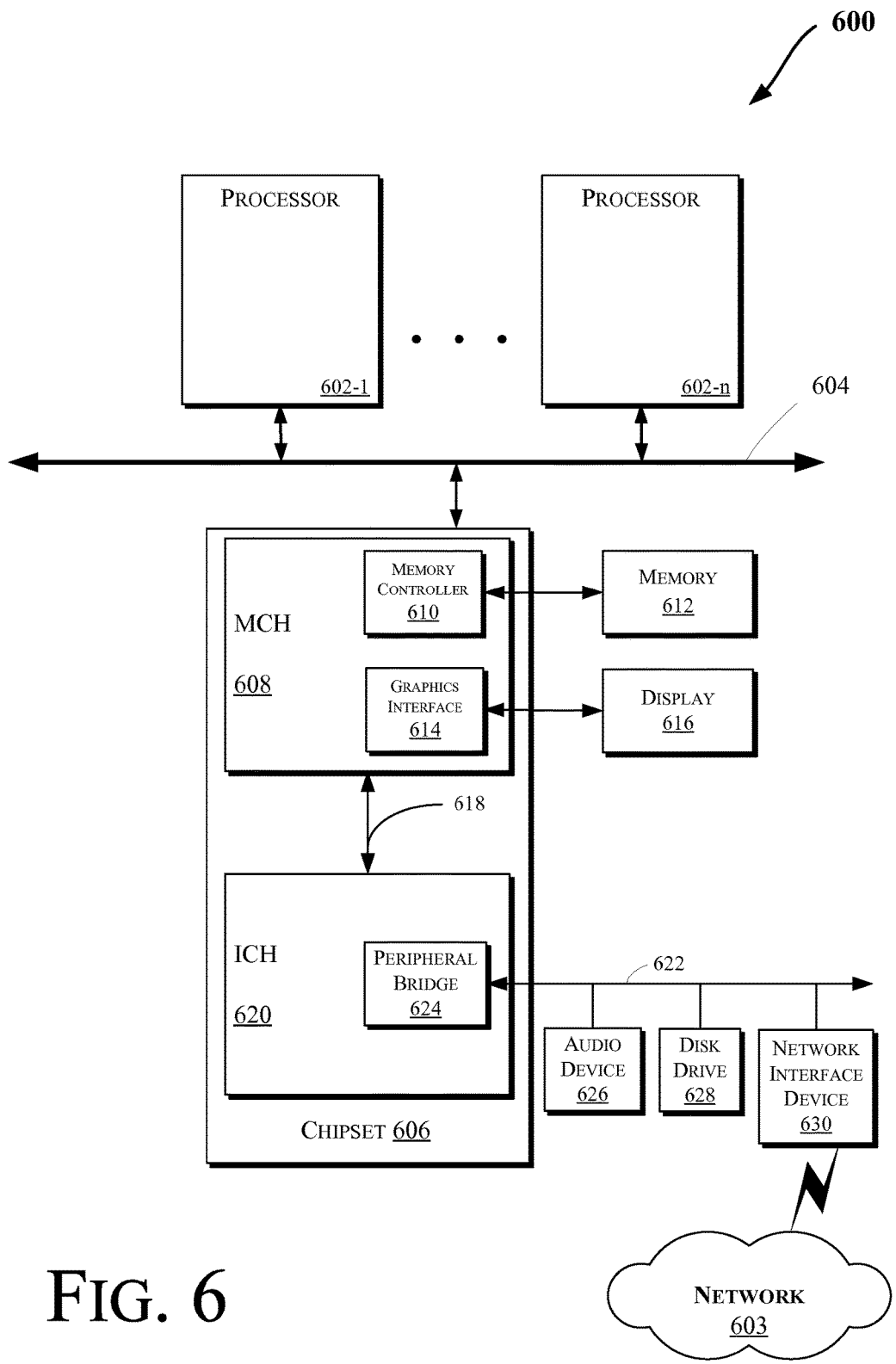
FIGS. 6-10 are schematic, block diagram illustrations of electronic devices which may be adapted to implement encryption integrity check in memory in accordance with various embodiments discussed herein.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a solid state drive (SSD). Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
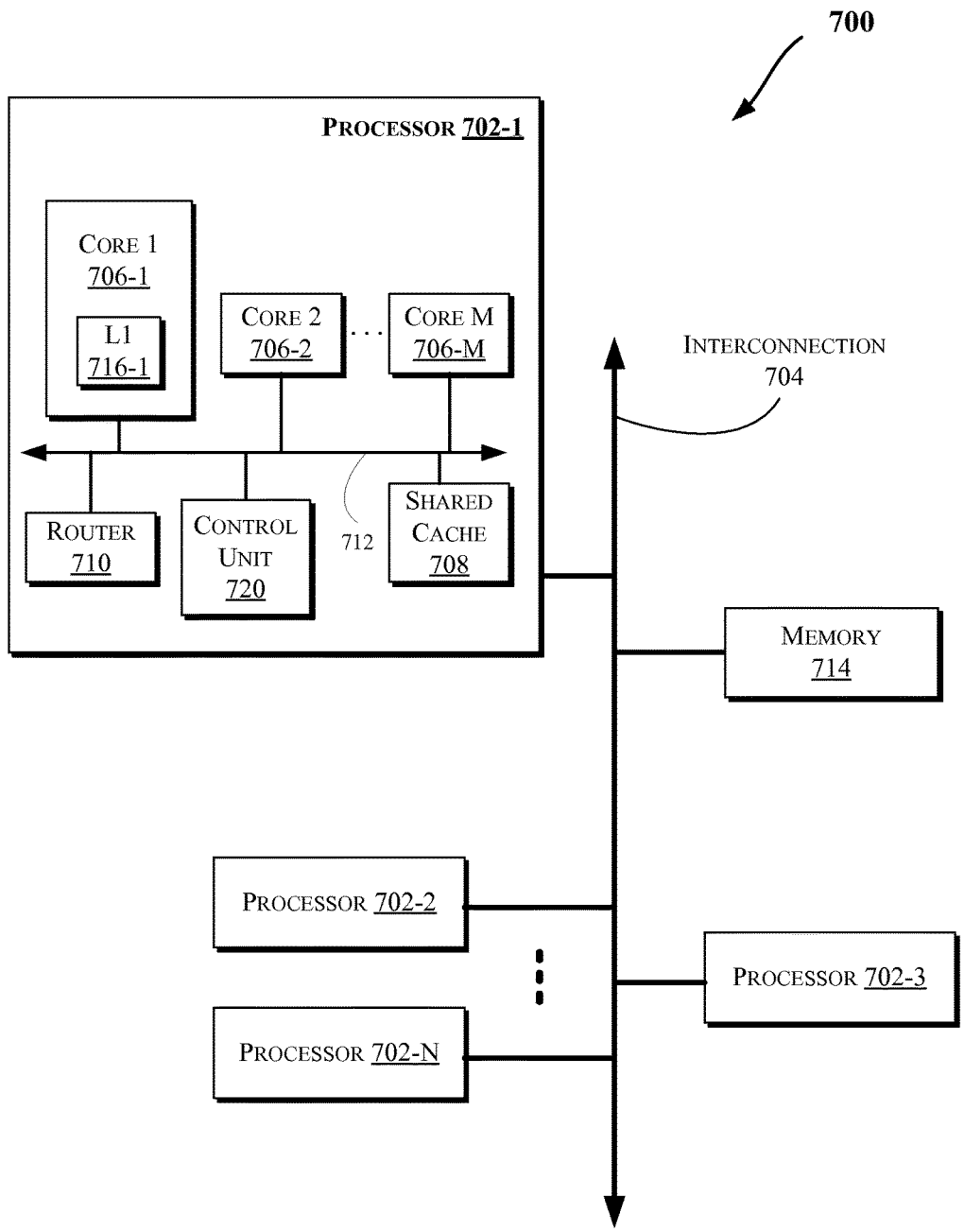

FIG. 7 illustrates a block diagram of a computing system 700, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716"). In one embodiment, the control unit 720 may include logic to implement the operations described above with reference to the memory controller 122 in FIG. 2.

Figure 8:
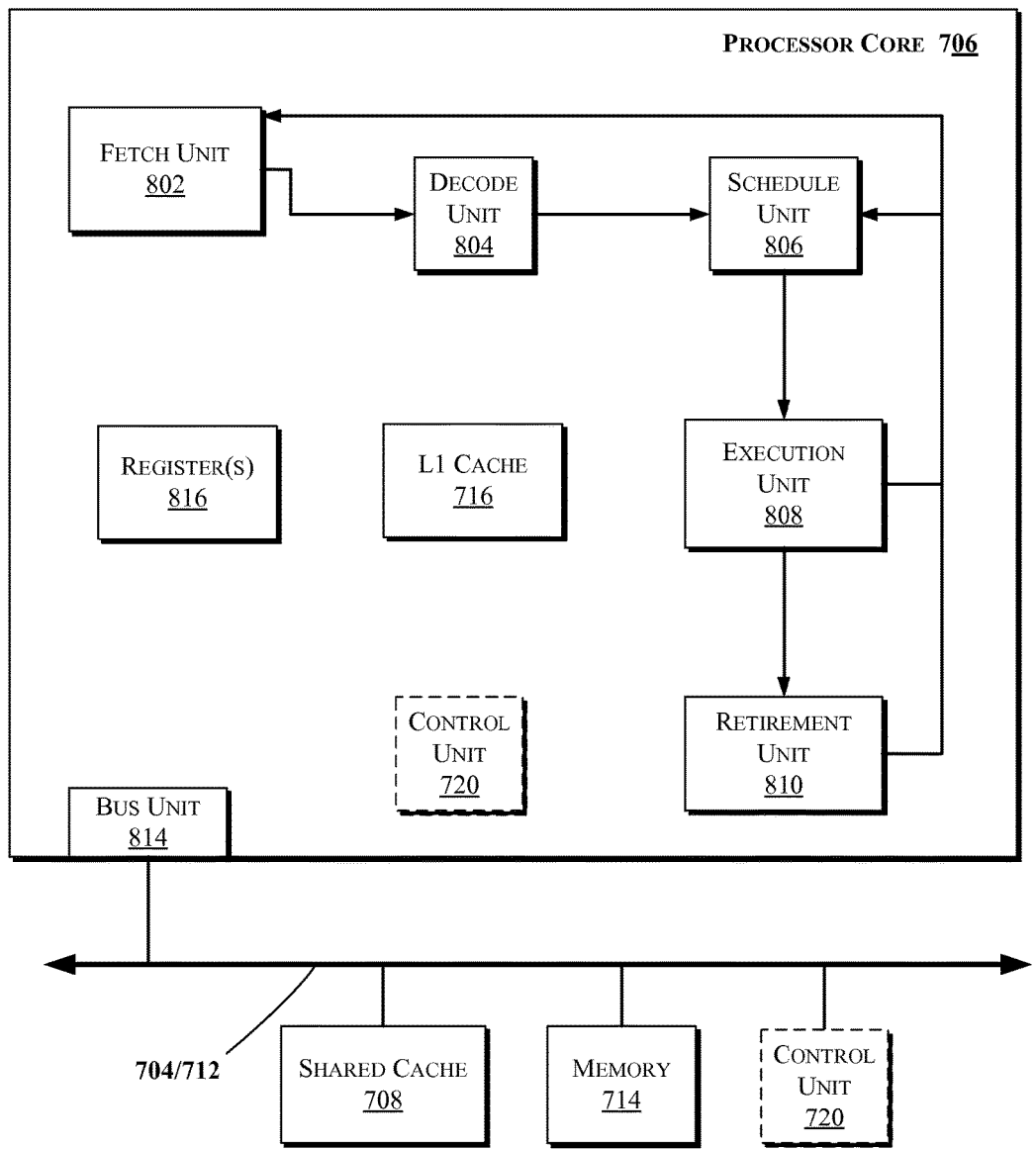

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
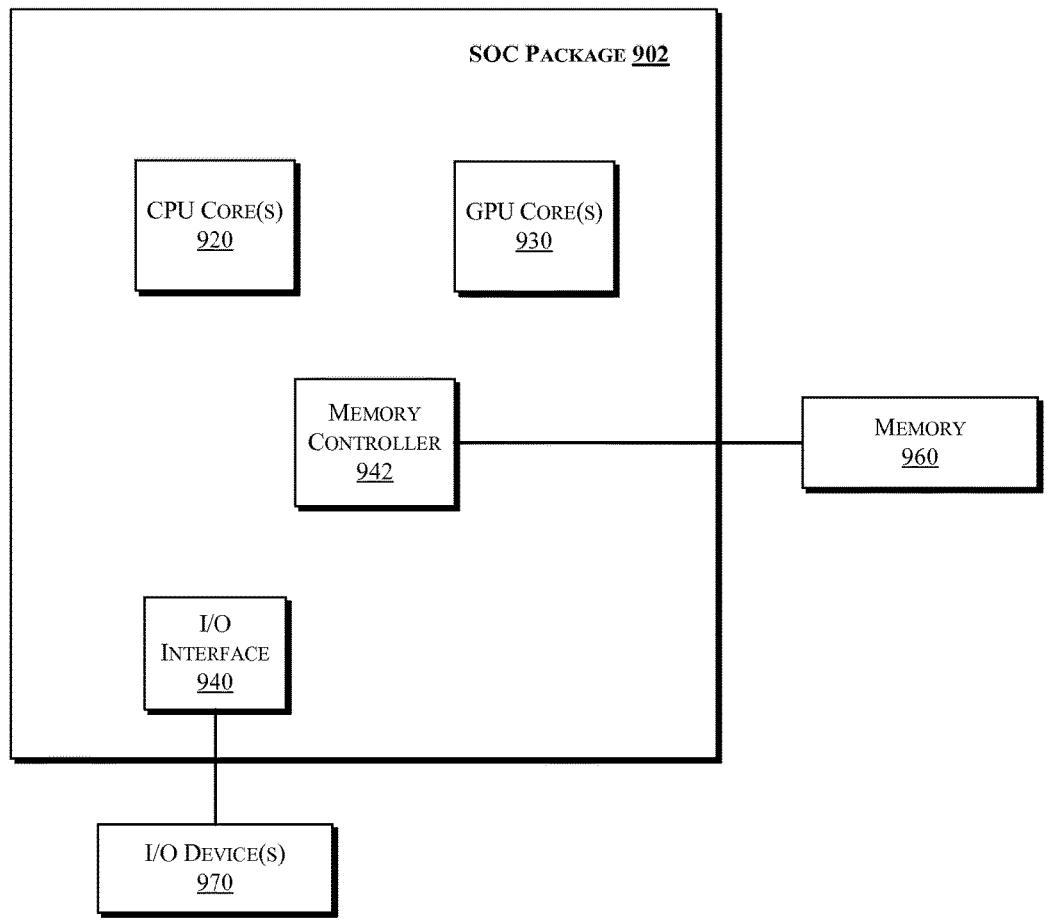

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
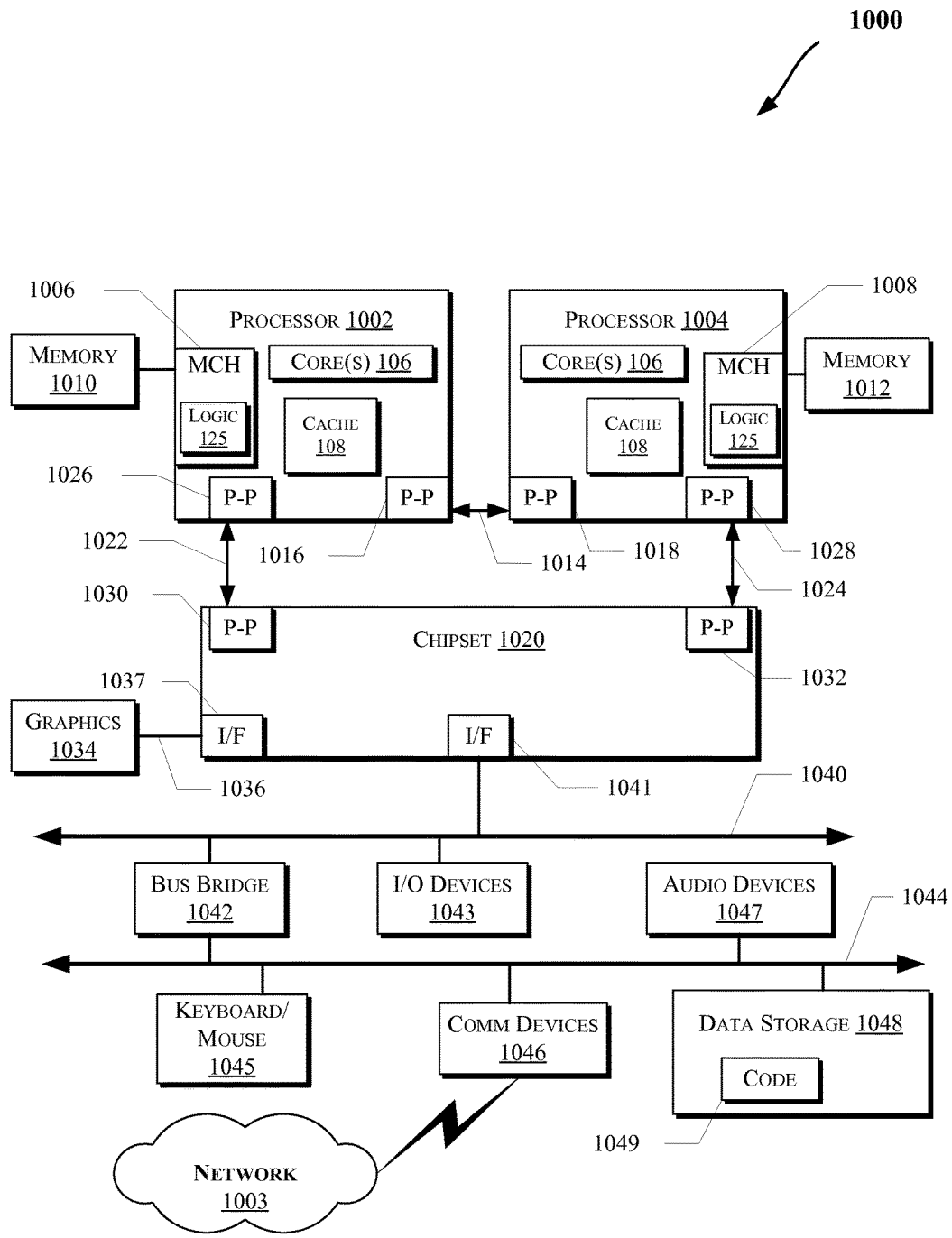

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some embodiments.

In an embodiment, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 902 and 904. Other embodiments of the invention, however, may exist in other circuits, logic units, or devices within the system 900 of FIG. 9. Furthermore, other embodiments of the invention may be distributed throughout several circuits, logic units, or devices illustrated in FIG. 9.

The chipset 920 may communicate with a bus 940 using a PtP interface circuit 941. The bus 940 may have one or more devices that communicate with it, such as a bus bridge 942 and I/O devices 943. Via a bus 944, the bus bridge 943 may communicate with other devices such as a keyboard/mouse 945, communication devices 946 (such as modems, network interface devices, or other communication devices that may communicate with the computer network 803), audio I/O device, and/or a data storage device 948. The data storage device 948 (which may be a hard disk drive or a NAND flash based solid state drive) may store code 949 that may be executed by the processors 902 and/or 904.

The following examples pertain to further embodiments.

Example 1 is a memory comprising a non-volatile memory device, and a controller coupled to the memory device and comprising logic to receive a write request from a host device to write a line of data to the memory device, determine a first plaintext cyclic redundancy check from the line of data, encrypt the line of data, encrypt the first plaintext CRC with a unique value to generate a first encrypted CRC, wherein the unique value comprises a nonce formed from a concatenation of a write count and at least one of a logical memory address or a physical memory address, and store the encrypted line of data and the first encrypted CRC in memory device.

In Example 2, the subject matter of Example 1 can optionally include logic to prepend a logical address to the line of data.

In Example 3, the subject matter of any one of Examples 1-2 can optionally include an arrangement in which the logical address comprises a logical block address (LBA), and the unique value comprises a nonce formed from a concatenation of a write count, the logical block address, and a number unique to the memory device.

In Example 4, the subject matter of any one of Examples 1-3 can optionally include logic to store the write count in the memory device.

In Example 5, the subject matter of any one of Examples 1-4 can optionally include logic to initiate a memory refresh operation, and recalculate the first encrypted CRC with a new unique value.

In Example 6, the subject matter of any one of Examples 1-5 can optionally include an arrangement in which the new unique value comprises a nonce formed from a concatenation of a write count associated with the refresh operation and a physical address in the memory device.

In Example 7, the subject matter of any one of Examples 1-6 can optionally include logic to receive a read request from a host device to read a line of data from the memory device, and retrieve the encrypted line of data and the first encrypted CRC from the memory device.

In Example 8, the subject matter of any one of Examples 1-7 can optionally include logic to decrypt the first encrypted CRC with a nonce formed from a concatenation of a write count and a physical address in the memory to form a second plaintext CRC, decrypt the line of data, prepend the LBA to line of data, and determine a third plaintext CRC from the line of data.

In Example 9, the subject matter of any one of Examples 1-8 can optionally include logic to return the line of data in response to the read request when the second plaintext CRC matches the third plaintext CRC.

In Example 10, the subject matter of any one of Examples 1-9 can optionally include logic to return a read error in response to the read request when the second plaintext CRC fails to match the third plaintext CRC.

Example 11 is an electronic device comprising a processor and a memory comprising a non-volatile memory device, and a controller coupled to the memory device and comprising logic to receive a write request from a host device to write a line of data to the memory device, determine a first plaintext cyclic redundancy check from the line of data, encrypt the line of data, encrypt the first plaintext CRC with a unique value to generate a first encrypted CRC, wherein the unique value comprises a nonce formed from a concatenation of a write count and at least one of a logical memory address or a physical memory address, and store the encrypted line of data and the first encrypted CRC in memory device.

In Example 12, the subject matter of Example 11 can optionally include logic to prepend a logical address to the line of data.

In Example 13, the subject matter of any one of Examples 11-12 can optionally include an arrangement in which the logical address comprises a logical block address (LBA), and the unique value comprises a nonce formed from a concatenation of a write count, the logical block address, and a number unique to the memory device.

In Example 14, the subject matter of any one of Examples 11-13 can optionally include logic to store the write count in the memory device.

In Example 15, the subject matter of any one of Examples 11-14 can optionally include logic to initiate a memory refresh operation, and recalculate the first encrypted CRC with a new unique value.

In Example 16, the subject matter of any one of Examples 11-15 can optionally include an arrangement in which the new unique value comprises a nonce formed from a concatenation of a write count associated with the refresh operation and a physical address in the memory device.

In Example 17, the subject matter of any one of Examples 11-16 can optionally include logic to receive a read request from a host device to read a line of data from the memory device, and retrieve the encrypted line of data and the first encrypted CRC from the memory device.

In Example 18, the subject matter of any one of Examples 11-17 can optionally include logic to decrypt the first encrypted CRC with a nonce formed from a concatenation of a write count and a physical address in the memory to form a second plaintext CRC, decrypt the line of data, prepend the LBA to line of data, and determine a third plaintext CRC from the line of data.

In Example 19, the subject matter of any one of Examples 11-18 can optionally include logic to return the line of data in response to the read request when the second plaintext CRC matches the third plaintext CRC.

In Example 20, the subject matter of any one of Examples 11-19 can optionally include logic to return a read error in response to the read request when the second plaintext CRC fails to match the third plaintext CRC.

Example 21 is a computer program product comprising logic instructions stored on a nontransitory computer readable medium which, when executed by a controller coupled to a memory device, configure the controller to receive a write request from a host device to write a line of data to the memory device, determine a first plaintext cyclic redundancy check from the line of data, encrypt the line of data, encrypt the first plaintext CRC with a unique value to generate a first encrypted CRC, wherein the unique value comprises a nonce formed from a concatenation of a write count and at least one of a logical memory address or a physical memory address, and store the encrypted line of data and the first encrypted CRC in memory device.

In Example 22, the subject matter of Example 21 can optionally include logic instructions stored on a nontransitory computer readable medium which, when executed by a controller coupled to a memory device, configure the controller to prepend a logical address to the line of data.

In Example 23, the subject matter of any one of Examples 21-22 can optionally include an arrangement in which the logical address comprises a logical block address (LBA), and the unique value comprises a nonce formed from a concatenation of a write count, the logical block address, and a number unique to the memory device.

In Example 24, the subject matter of any one of Examples 21-23 can optionally include logic instructions stored on a nontransitory computer readable medium which, when executed by a controller coupled to a memory device, configure the controller to store the write count in the memory device.

In Example 25, the subject matter of any one of Examples 21-24 can optionally include logic instructions stored on a nontransitory computer readable medium which, when executed by a controller coupled to a memory device, configure the controller to initiate a memory refresh operation, and recalculate the first encrypted CRC with a new unique value.

In Example 26, the subject matter of any one of Examples 21-25 can optionally include an arrangement in which the new unique value comprises a nonce formed from a concatenation of a write count associated with the refresh operation and a physical address in the memory device.

In Example 27, the subject matter of any one of Examples 21-26 can optionally include logic instructions stored on a nontransitory computer readable medium which, when executed by a controller coupled to a memory device, configure the controller to receive a read request from a host device to read a line of data from the memory device, and retrieve the encrypted line of data and the first encrypted CRC from the memory device.

In Example 28, the subject matter of any one of Examples 21-27 can optionally include logic instructions stored on a nontransitory computer readable medium which, when executed by a controller coupled to a memory device, configure the controller to decrypt the first encrypted CRC with a nonce formed from a concatenation of a write count and a physical address in the memory to form a second plaintext CRC, decrypt the line of data, prepend the LBA to line of data, and determine a third plaintext CRC from the line of data.

In Example 29, the subject matter of any one of Examples 21-28 can optionally include logic instructions stored on a nontransitory computer readable medium which, when executed by a controller coupled to a memory device, configure the controller to return the line of data in response to the read request when the second plaintext CRC matches the third plaintext CRC.

In Example 30, the subject matter of any one of Examples 21-29 can optionally include logic instructions stored on a nontransitory computer readable medium which, when executed by a controller coupled to a memory device, configure the controller to return a read error in response to the read request when the second plaintext CRC fails to match the third plaintext CRC.

In various embodiments of the invention, the operations discussed herein, e.g., with reference to FIGS. 1-10, may be implemented as hardware (e.g., circuitry), software, firmware, microcode, or combinations thereof, which may be provided as a computer program product, e.g., including a tangible (e.g., nontransitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A memory, comprising:
   a non-volatile memory device; and
   a controller coupled to the memory device and comprising logic to:
     receive a write request from a host device to write a line of data having a logical block address to the memory device at a physical memory address, where the physical memory address includes a write count that is incremented for each write operation;
     generate a first plaintext cyclic redundancy check (CRC) from a concatenation of the line of data and the logical block address;
     encrypt, by a first encoder, the line of data to generate an encrypted line of data;
     encrypt, by a second encoder, a nonce formed from a concatenation of the write count and the physical memory address to generate an encrypted value that is unique to the write request;
     perform an XOR operation with the first plaintext CRC and the encrypted value to generate a first encrypted CRC; and
     store the encrypted line of data and the first encrypted CRC in the memory device to complete the write request.

2. The memory of claim 1, wherein the controller further comprises logic to:
   store the write count in the memory device.

3. The memory of claim 1, wherein the controller further comprises logic to:
   initiate a memory refresh operation at the physical memory address;
   update the write count of the physical memory address to an updated write count; and
   update the first encrypted CRC with an updated encrypted value to generate an updated encrypted CRC.

4. The memory of claim 3, wherein, in updating the first encrypted CRC, the controller further comprises logic to:
   encrypt, by the second encoder, an updated nonce formed from a concatenation of the updated write count and the physical memory address to generate an updated encrypted value; and
   perform an XOR operation with the first plaintext CRC and the updated encrypted value to generate the updated encrypted CRC.

5. The memory of claim 1, wherein the controller further comprises logic to:
   receive a read request from a host device to read the encrypted line of data from the physical memory address; and
   retrieve the encrypted line of data, the write count, and the first encrypted CRC from the physical memory address.

6. The memory of claim 5, further comprising logic to:
   decrypt the encrypted line of data to generate a decrypted line of data;
   generate a decrypted data plaintext CRC from a concatenation of the decrypted line of data and the logical block address of the read request;
   encrypt, by the second encoder, a nonce formed from a concatenation of the write count and the physical memory address to generate a second encrypted value; and
   perform an XOR operation with the first encrypted CRC and the second encrypted value to generate a second plaintext CRC.

7. The memory of claim 6, further comprising logic to:
   return the decrypted line of data in response to the read request when the second plaintext CRC matches the decrypted data plaintext CRC.

8. The memory of claim 7, further comprising logic to:
   return a read error in response to the read request when the second plaintext CRC fails to match the decrypted data plaintext CRC.

9. An electronic device, comprising:
   a processor; and
   a memory device, comprising:
      a non-volatile memory device; and
      a controller coupled to the memory device and comprising logic to:
         receive a write request from a host device to write a line of data having a logical block address to the memory device at a physical memory address, where the physical memory address includes a write count that is incremented for each write operation;
         generate a first plaintext cyclic redundancy check (CRC) from a concatenation of the line of data and the logical block address;
         encrypt, by a first encoder, the line of data to generate an encrypted line of data;
         encrypt, by a second encoder, a nonce formed from a concatenation of the write count and the physical memory address to generate an encrypted value that is unique to the write request;
         perform an XOR operation with the first plaintext CRC and the encrypted value to generate a first encrypted CRC; and
         store the encrypted line of data and the first encrypted CRC in the memory device to complete the write request.

10. The electronic device of claim 9, wherein the controller further comprises logic to:
   store the write count in the memory device.

11. The electronic device of claim 9, wherein the controller further comprises logic to:
   initiate a memory refresh operation at the physical memory address;
   update the write count of the physical memory address to an updated write count; and
   update the first encrypted CRC with an updated encrypted value to generate an updated encrypted CRC.

12. The electronic device of claim 11, wherein, in updating the first encrypted CRC, the controller further comprises logic to:
   encrypt, by the second encoder, an updated nonce formed from a concatenation of the updated write count and the physical memory address to generate an updated encrypted value; and
   perform an XOR operation with the first plaintext CRC and the updated encrypted value to generate the updated encrypted CRC.

13. The electronic device of claim 9, wherein the controller further comprises logic to:
   receive a read request from a host device to read the encrypted line of data from the physical memory address;
   retrieve the encrypted line of data, the write count, and the first encrypted CRC from the physical memory address.

14. The electronic device of claim 13, further comprising logic to:
   decrypt the encrypted line of data to generate a decrypted line of data;
   generate a decrypted data plaintext CRC from a concatenation of the decrypted line of data and the logical block address of the read request;
   encrypt, by the second encoder, a nonce formed from a concatenation of the write count and the physical memory address to generate a second encrypted value; and
   perform an XOR operation with the first encrypted CRC and the second encrypted value to generate a second plaintext CRC.

15. The electronic device of claim 14, further comprising logic to:
   return the decrypted line of data in response to the read request when the second plaintext CRC matches the decrypted data plaintext CRC.

16. The electronic device of claim 15, further comprising logic to:
   return a read error in response to the read request when the second plaintext CRC fails to match the decrypted data plaintext CRC.

17. A computer program product comprising logic instructions stored on a nontransitory computer readable medium which, when executed by a controller coupled to a memory device, configure the controller to:
   receive a write request from a host device to write a line of data having a logical block address to a memory device at a physical memory address, where the physical memory address includes a write count that is incremented for each write operation;

generate a first plaintext cyclic redundancy check (CRC) from a concatenation of the line of data and the logical block address;

encrypt, by a first encoder, the line of data to generate an encrypted line of data;

encrypt, by a second encoder, a nonce formed from a concatenation of the write count and the physical memory address to generate an encrypted value that is unique to the write request;

perform an XOR operation with the first plaintext CRC and the encrypted value to generate a first encrypted CRC; and store the encrypted line of data and the first encrypted CRC in the memory device to complete the write request.

18. The computer program product of claim 17, wherein the controller further comprises logic instructions stored on a nontransitory computer readable medium which, when executed by a controller coupled to a memory device, configure the controller to
store the write count in the memory.

19. The computer program product of claim 17, wherein the controller further comprises logic instructions stored on a nontransitory computer readable medium which, when executed by a controller coupled to a memory device, configure the controller to:
initiate a memory refresh operation at the physical memory address;
update the write count of the physical memory address to an updated write count; and
update the first encrypted CRC with an updated encrypted value to generate an updated encrypted CRC.

20. The computer program product of claim 19, wherein, in updating the first encrypted CRC, the controller is further configured to:
encrypt, by the second encoder, an updated nonce formed from a concatenation of the updated write count and the physical memory address to generate an updated encrypted value; and
perform an XOR operation with the first plaintext CRC and the updated encrypted value to generate the updated encrypted CRC.

21. The computer program product of claim 17, wherein the controller further comprises logic instructions stored on a nontransitory computer readable medium which, when executed by a controller coupled to a memory device, configure the controller to:
receive a read request from a host device to read the encrypted line of data from the physical memory address;
retrieve the encrypted line of data, the write count, and the first encrypted CRC from the physical memory address.

22. The computer program product of claim 21, further comprising logic instructions stored on a nontransitory computer readable medium which, when executed by a controller coupled to a memory device, configure the controller to:
decrypt the encrypted line of data to generate a decrypted line of data;
generate a decrypted data plaintext CRC from a concatenation of the decrypted line of data and the logical block address of the read request;
encrypt, by the second encoder, a nonce formed from a concatenation of the write count and the physical memory address to generate a second encrypted value; and
perform an XOR operation with the first encrypted CRC and the second encrypted value to generate a second plaintext CRC.

23. The computer program product of claim 22, further comprising logic instructions stored on a nontransitory computer readable medium which, when executed by a controller coupled to a memory device, configure the controller to:
return the decrypted line of data in response to the read request when the second plaintext CRC matches the decrypted data plaintext CRC.

24. The computer program product of claim 23, further comprising logic instructions stored on a nontransitory computer readable medium which, when executed by a controller coupled to a memory device, configure the controller to:
return a read error in response to the read request when the second plaintext CRC fails to match the decrypted data plaintext CRC.

* * * * *